United States Patent
Telang et al.

(10) Patent No.: US 8,964,907 B2
(45) Date of Patent: Feb. 24, 2015

(54) MULTI-PROTOCOL COMMUNICATIONS RECEIVER WITH SHARED ANALOG FRONT-END

(71) Applicant: Broadcom Corporation, Irvine, CA (US)

(72) Inventors: Vivek Pundlik Telang, Austin, TX (US); Hong Chen, Irvine, CA (US); Vasudevan Parthasarathy, Irvine, CA (US); Jun Cao, Irvine, CA (US); Afshin Momtaz, Laguna Hills, CA (US); Ali Ghiasi, Cupertino, CA (US); Chung-Jue Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 55 days.

(21) Appl. No.: 13/871,831

(22) Filed: Apr. 26, 2013

(65) Prior Publication Data

US 2013/0243072 A1  Sep. 19, 2013

Related U.S. Application Data

(63) Continuation of application No. 12/883,842, filed on Sep. 16, 2010, now Pat. No. 8,442,159.

(60) Provisional application No. 61/360,571, filed on Jul. 1, 2010.

(51) Int. Cl.
| | | |
|---|---|---|
| *H03D 1/00* | (2006.01) | |
| *H04L 27/06* | (2006.01) | |
| *H04L 27/00* | (2006.01) | |
| *H04B 1/00* | (2006.01) | |

(52) U.S. Cl.
CPC .......... *H04L 27/0002* (2013.01); *H04B 1/0007* (2013.01); *H04B 1/406* (2013.01)
USPC ........... 375/340; 375/316; 375/345; 375/259; 375/257; 375/219

(58) Field of Classification Search
CPC ............ H04B 1/40; H04B 3/23; H04B 1/403; H04B 1/30; H04B 1/28; H04B 1/1036; H04B 1/406; H04B 1/005; H04B 1/0057; H04B 1/1615; H04L 27/2601; H04L 25/4927; H04L 5/1438; H04L 27/2608; H04L 27/10; H04L 27/2273; H04L 27/2071; H04L 25/0272; H04L 25/0292; H04L 25/08; H04L 7/0008; H04L 25/4902; H04L 1/0009; H04L 1/0041; H04L 25/49; H04L 27/2647; H04L 1/20; H04L 25/067; H04L 1/0045; H04L 1/005; H04L 1/0054; H04L 27/3809; H04L 25/03038; H04L 2025/03414; H04L 25/03057; H04M 11/06; H04M 11/062; H04M 1/72519; H04M 1/72522; H04M 1/0214; H04M 2250/12; H03G 3/3052; H03G 3/3068; H03G 3/001; H03G 3/3078; H04W 88/02; H04W 88/06; H04W 52/02; H04W 52/0229; H04W 52/0225; H04W 52/028
USPC ......... 375/340, 316, 345, 219, 220, 223, 350, 375/259, 257; 455/550.1, 553.1, 574
See application file for complete search history.

(56) References Cited

U.S. PATENT DOCUMENTS

| | | | |
|---|---|---|---|
| 6,469,649 B1 | 10/2002 | Helkey et al. | |
| 8,442,159 B2 * | 5/2013 | Telang et al. | ................. 375/340 |
| 2008/0225182 A1 | 9/2008 | Silver et al. | |
| 2008/0232480 A1 | 9/2008 | Tuttle et al. | |
| 2008/0261548 A1 | 10/2008 | Krone | |
| 2012/0002713 A1 | 1/2012 | Telang | |

FOREIGN PATENT DOCUMENTS

| | | |
|---|---|---|
| CN | 1914812 A | 2/2007 |
| CN | 101459643 A | 6/2009 |
| EP | 1708361 A2 | 10/2006 |

OTHER PUBLICATIONS

U.S. Appl. No. 12/883,842 Non-Final Office Action mailed Nov. 8, 2012, 8 pages.
U.S. Appl. No. 12/883,842 Notice of Allowance mailed Jan. 18, 2013, 9 pages.

* cited by examiner

*Primary Examiner* — Phuong Phu
(74) *Attorney, Agent, or Firm* — McDermott Will & Emery LLP

(57) ABSTRACT

According to an example embodiment, a communications receiver may include a variable gain amplifier (VGA) configured to amplify received signals, a VGA controller configured to control the VGA, a plurality of analog to digital converter (ADC) circuits coupled to an output of the VGA, wherein the plurality of ADC circuits are operational when the communications receiver is configured to process signals of a first communications protocol, and wherein only a subset of the ADC circuits are operational when the communications receiver is configured to process signals of a second communications protocol.

19 Claims, 3 Drawing Sheets

MULTI-PROTOCOL COMMUNICATIONS RECEIVER WITH SHARED ANALOG FRONT-END

CROSS-REFERENCE TO RELATED APPLICATIONS

This application is a continuation of U.S. Utility Ser. No. 12/883,842, filed on Sep. 16, 2010, entitled "Multi-Protocol Communications Receiver With Shared Analog Front-End", which claims priority to US Provisional application Ser. No. 61/360,571, filed on Jul. 1, 2010, entitled "Multi-Protocol Communications Receiver With Shared Analog Front-End," incorporated herein by reference.

BACKGROUND

There are a number of different communications standards or protocols. A communications or networking receiver (which may be provided in a transceiver or transmitter/receiver) may accommodate one or more of these standards or protocols. When a new protocol is developed or added, a manufacturer often times may develop a new chip (or new transceiver) to accommodate the new protocol if it cannot be handled by an existing transceiver.

SUMMARY

Various example embodiments are disclosed relating to a multi-protocol communications receiver with a shared analog front end. According to an example embodiment, a communications receiver may include a variable gain amplifier (VGA) configured to amplify received signals, a VGA controller configured to control the VGA, a plurality of analog to digital converter (ADC) circuits coupled to an output of the VGA, wherein the plurality of ADC circuits are operational when the communications receiver is configured to process signals of a first communications protocol, and wherein only a subset of the ADC circuits are operational when the communications receiver is configured to process signals of a second communications protocol.

According to another example embodiment, a communications receiver may include an analog front end including a plurality of analog to digital converter (ADC) circuits, wherein the plurality of ADC circuits are operational when the communications receiver is configured to process signals of a first communications protocol, and wherein only a subset of the ADC circuits are operational when the communications receiver is configured to process signals of a second communications protocol.

According to an example embodiment, a method may include configuring a communications receiver to operate in one of a plurality of modes, including a first mode in which the receiver is configured to process signals of a first communications protocol and a second mode in which the receiver is configured to process signals of a second communications protocol; wherein a plurality of analog to digital converter (ADC) circuits of the communications receiver are configured to be operative when the receiver is configured to process signals of a first communications protocol; and wherein only a subset of the ADC circuits of the communications receiver are configured to be operative when the communications receiver is configured to process signals of a second communications protocol, with a remaining portion of the ADC circuits being non-operative.

DETAILED DESCRIPTION

Figure 1:
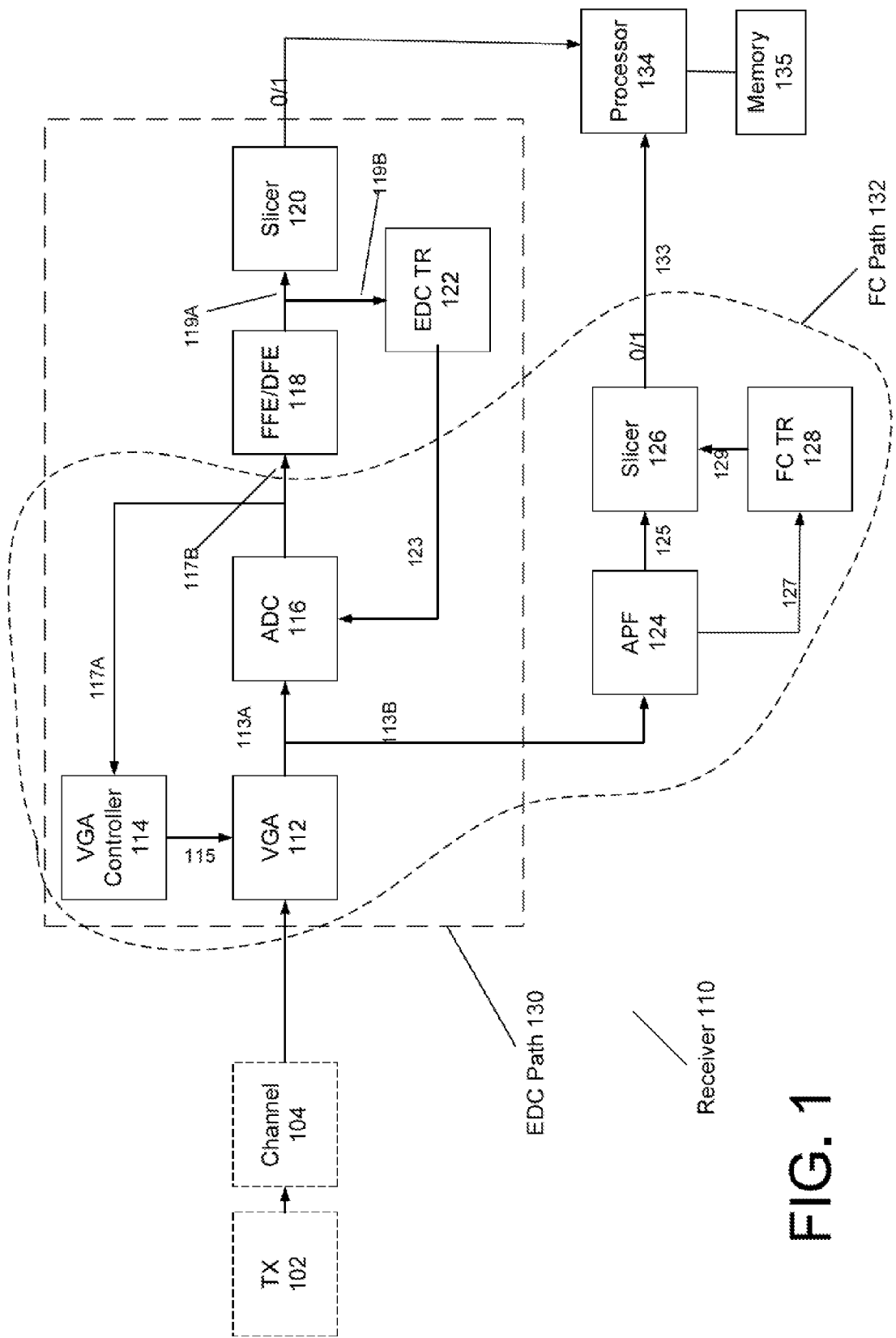
FIG. 1 is a block diagram of a communications receiver according to an example embodiment.

FIG. 1 is a block diagram illustrating a communications receiver 110 according to an example embodiment. Data may be transmitted by a transmitter (TX) 102 via a channel 104, and received by a communications receiver 110. Communications receiver 110 may be part of a communications transceiver (transmitter/receiver), which may include both a transmitter for transmitting signals (similar to TX 102, but not shown) and a receiver 110 for receiving and processing signals.

A networking node or device may be provided on each side of channel 104, with each node including, for example, a communications (or network) transceiver, a processor for providing overall control and executing instructions, memory for storing data and instructions, and other circuits. The channel 104 may be any communications channel, such as, for example, a wired channel (e.g., channel provided via copper line, fiber optic cable, coaxial cable, or other connection), wireless channel, etc. Receiver 110 shown in FIG. 1 illustrates an example embodiment of a receiver architecture, and other receiver architectures may be used as well.

According to an example embodiment, the communications receiver 110 may be considered to be a multi-protocol receiver because it is able to accommodate or process signals for multiple communications protocols. According to an example embodiment, path 130 (which may be referred to as EDC path 130 or electronic dispersion control path) may include a group of blocks or circuits that may be used to process signals for one or more IEEE (Institute of Electrical and Electronics Engineers) protocols, such as for IEEE 10GBASE-LRM (for legacy multi-mode fiber), IEEE 10GBASE-SR/LR (single mode and multi-mode fiber) or IEEE 10GBASE-KR (copper backplane). All of these IEEE protocols include some signal characteristics in common that allow the same group of blocks or circuits (path 130) to process signals for one or more of these IEEE protocols. In addition, in an example embodiment, the EDC path 130 may also support other specifications or protocols, such as "SFF 8431 Specifications for Enhanced Small Form Factor Pluggable Module SFP+", which is sometimes referred to as SFP+.

Similarly, a fibre channel (FC) path 132 may include a group of blocks or circuits that may be used to process Fibre Channel (FC) signals. In another example embodiment, in addition to supporting Fibre Channel (FC), the FC path 132 may also support 10 GBASE-SR/LR (single mode and multi-mode fiber) in an alternative "low power" mode, e.g., in which only some of the ADC circuits are turned on, with some ADC circuits (of ADC 116) being turned off, as described in more detail below. One or more blocks or circuits may be common to both the EDC path 130 and FC path 132, as described in greater detail below.

A signal may be transmitted by a transmitter (TX) 102 via a channel 104, and received by receiver 110. A variable gain amplifier (VGA) 112 may receive and amplify (or increase the amplitude) of the received signal. In an example embodiment, the VGA 112 may amplify the received analog signal to provide an output analog signal via lines 113A, 113B that has a substantially constant amplitude (or an amplitude within a specific range of amplitudes). VGA 112 may be controlled by VGA controller 114, such that VGA 112 outputs a signal within a specific range of amplitudes, for example. An analog-to-digital converter (ADC) 116 may convert the received analog signal to a digital signal (output from VGA 112), e.g., by sampling and quantizing the received analog signal.

The digital output of ADC 116 may be input to VGA controller 114. Based on the digital amplitude signal received from ADC 116 via line 117A, the VGA controller may output a control signal via line 115 to VGA 112 to adjust the amplitude of the signal output of VGA 112 so that the VGA output signal falls within a range of amplitudes. For example, if the digital amplitude signal received via line 117A is above a first threshold, then VGA controller may output a signal via line 115 to VGA 112 to cause VGA 112 to decrease the amplitude of its output signal. Likewise, if the digital signal received via line 117A is below a second threshold, then VGA controller 114 may output a signal via line 115 to cause VGA 112 to increase the amplitude of its output signal.

The digital signal output from ADC 116 is input to an equalizer 118 via line 117B. Equalizer 118 may include, for example a Feed Forward Equalizer (FFE) and a Decision Feedback Equalizer (DFE), shown as FFE/DFE 118 in FIG. 1. Equalizer 118 may provide digital signal or pulse shaping, e.g., to make the pulse of the received signal more square. A signal output from equalizer 118 is input to a slicer 120 (or 0/1 decision block), where the slicer 120 samples the signal (for each bit location) and determines whether the received signal is a 0 (e.g., having an amplitude above a first threshold), or a 1 (e.g., having an amplitude below a second threshold) for each bit. Thus, slicer 120 may output a string of 0s and 1s to a processor 134 for processing. Processor 134 may be a hardware processor, a microprocessor that executes software instructions stored in memory for processing the received digital data, or a combination of hardware and/or software.

According to an example embodiment, an EDC timing recovery (EDC TR) 122 may receive the output of equalizer 118 as an input, and may determine peaks and/or valleys of the received signal. For example EDC TR 122 may detect the valleys (or low amplitude points), and then determine the peaks (or high amplitude points), and then provides a signal via line 123 that instructs the ADC 116 where to sample the received signal, e.g., to better or more accurately sample the received analog signal at the peak or best point to provide the most accurate 0/1 detection by slicer 120, for example. Thus, EDC TR 122 may provide a control signal via line 123 to adjust where the ADC 116 samples the received analog signal, e.g., so as to improve the receiver (and slicer) operation.

In an example embodiment, EDC TR 122 may be configured to perform timing recovery (or provide sampling control for ADC 116) specifically for a group of IEEE protocols that may use the same or similar data format, or data/signalling constraints, as examples. For example, the IEEE protocols (and possibly other specifications or protocols) processed by EDC path 130 may, at least in some cases, require a scrambing format or data format that provides a specific scrambling of 0s and 1s. Thus, EDC TR 122 may be specifically configured to perform timing recovery (or sampling control) based on the specific signal or data format and/or rules for these IEEE protocols, according to an example embodiment. EDC path 130 may support other protocols or specifications.

Receiver 110 may also include a Fibre Channel (FC) path 132 for processing Fibre Channel signals and/or signals of other protocols or specifications that can be processed using the lower power mode of the FC path, e.g., where one or more of the ADCs (e.g., FIG. 2) may be powered off or turned off.

For the FC path 132, an amplified signal output by VGA 112 is input to the ADC 116 via line 113A and an analog peaking filter (APF) 124 via line 113B. In one example embodiment, ADC 116 may sample and quantize each and every bit of the analog signal received from VGA 112. The quantized or digitized bits or signals may be input to VGA controller 114 via line 117A, where the VGA controller 114 may output a control signal via line 115 to control VGA 112 as described above for EDC path 130. In another example embodiment, only a portion of the ADC 116 may be operative (e.g., during FC mode or while the blocks of the FC path 132 process FC signals), so as to sample only some (or only a subset) of the bits of the received signal for VGA control, which may allow power to be conserved. This second embodiment is described in greater detail below in connection with FIG. 2.

Referring again to the FC path 132, APF 124 may be an analog equalizer for providing equalization on (or equalizing) the received analog signal. The received Fibre channel signal may be more benign (e.g., less distortion) than the IEEE/EDC signal, and as a result, a DFE/FFE equalizer may be particularly useful for the EDC path 130, but may not be necessary for the FC path 132. APF 124 outputs the equalized analog signal via lines 125 and 127 to a slicer 126 and to a Fibre Channel timing recovery circuit (FC TR) 128, respectively. Slicer 126 (or 0/1 decision block), may sample (for each bit location) the equalized analog signal via line 125 signal and determines whether the received signal is a 0 (e.g., having an amplitude above a first threshold), or a 1 (e.g., having an amplitude below a second threshold) for each bit. Thus, slicer 126 may sample all bits, based on the received analog signal, and output a string of 0s and 1s to a processor 134 for processing.

Fibre Channel timing recovery circuit (FC TR 128) may detect peaks (or high voltage points) and/or valleys (or low voltage points) in the received signal, or may detect 0s and 1s, and may input a control signal via line 129 to instruct slicer 126 where to slice or sample the received analog signal (e.g., to adjust the slicer to better sample at the peak of the signal for each bit). In an example embodiment, FC TR 128 may be a timing recovery circuit configured to perform timing recovery for Fibre Channel signals. For example, the signal or data format, scrambling format, or other protocol rules for Fibre Channel may be different than one or more of the IEEE protocols, and therefore, may (in some cases) need a separate timing recovery circuit.

As shown in FIG. 1, receiver 110 may include a shared circuit that is used for both the EDC/IEEE path 130 and the FC path 132. This shared circuit may be considered, for example, a shared (or common) analog front end that may include VGA 112, ADC 116, and VGA controller 114. Thus, for example, the EDC path 130 may include a shared analog front end (e.g., VGA 112, VGA controller 114 and ADC 116), plus a first sub-circuit that may include equalizer (FFE/DFE) 118, slicer 120 and EDC TR 122. Likewise, FC path 132 may include the shared analog front end (e.g., blocks 114, 112 and 116), plus a second sub-circuit that may include APF 124, slicer 126 and FC TR 128.

In an example embodiment, the receiver 110 may be configured to operate in one of two modes, for example. For example, the receiver 110 may be configured to operate in an EDC/IEEE mode where the EDC path 130 may receive and process signals of an IEEE protocol (such as one or more of the IEEE protocols noted above, as examples). Or the receiver 110 may be configured to operate in a FC mode where the blocks or circuits of the FC path 132 may receive and process Fibre Channel signals.

In an example embodiment, the receiver 110 may be configured in an EDC/IEEE mode where power is applied to the blocks/circuits of the EDC/IEEE path 130 (including VGA 112, VGA controller 114, ADC 116, equalizer 118, slicer 120 and EDC TR 122), and power may not be applied to the unshared blocks of the FC path 132 (the APF 124, slicer 126 and FC TR 128), e.g., to conserve power. Thus, in this example embodiment, blocks 124, 126 and 128 may be non-operative (or turned off) during IEEE/EDC mode to conserve power.

Similarly, the receiver 110 may be configured in a FC mode where power is applied to the FC path 132 (including blocks VGA 112, VGA controller 114, ADC 116, APF 124, slicer 126 and FC TR 128) so that these blocks are operative, and power is not applied to the unshared blocks of the IEEE/EDC path 130 (equalizer 118, slicer 120 and EDC TR 122), e.g., to conserve power. Thus, in this example embodiment, blocks 118, 120 and 122 may be non-operative (or turned off) during the FC mode to conserve power.

As noted, the receiver 110 may be configured to operate in one of two modes, for example. For example, the receiver 110 may be configured to operate in an EDC/IEEE mode where the EDC path 130 may receive and process signals of an IEEE protocol (such as one or more of the IEEE protocols noted above, as examples). Or the receiver 110 may be configured to operate in a FC mode where the blocks or circuits of the FC path 132 may receive and process Fibre Channel signals (and possibly signals of other specifications or protocols that can be processed in a low power mode of FC path 132). A mode may be selected, for example, by configuring a register or memory location in a memory 135 with a first code for IEEE/EDC mode, and a second code for FC mode. Processor 134 may read the code in the register or memory 134, and may cause power to be applied to the identified path (either EDC path 130 or FC path 132), with power not being applied to the non-shared blocks of the non-selected path, for example. For example, a user may write a code to a register or memory location within memory 135, or processor 134 may write the code to a register or memory location (e.g., based on software or firmware executed by processor 134) to cause receiver 110 to be configured to operate in either the EDC/IEEE mode or FC mode. These are merely examples, and other techniques may be used to select one of the plurality of modes of operation for receiver 110.

Figure 2:
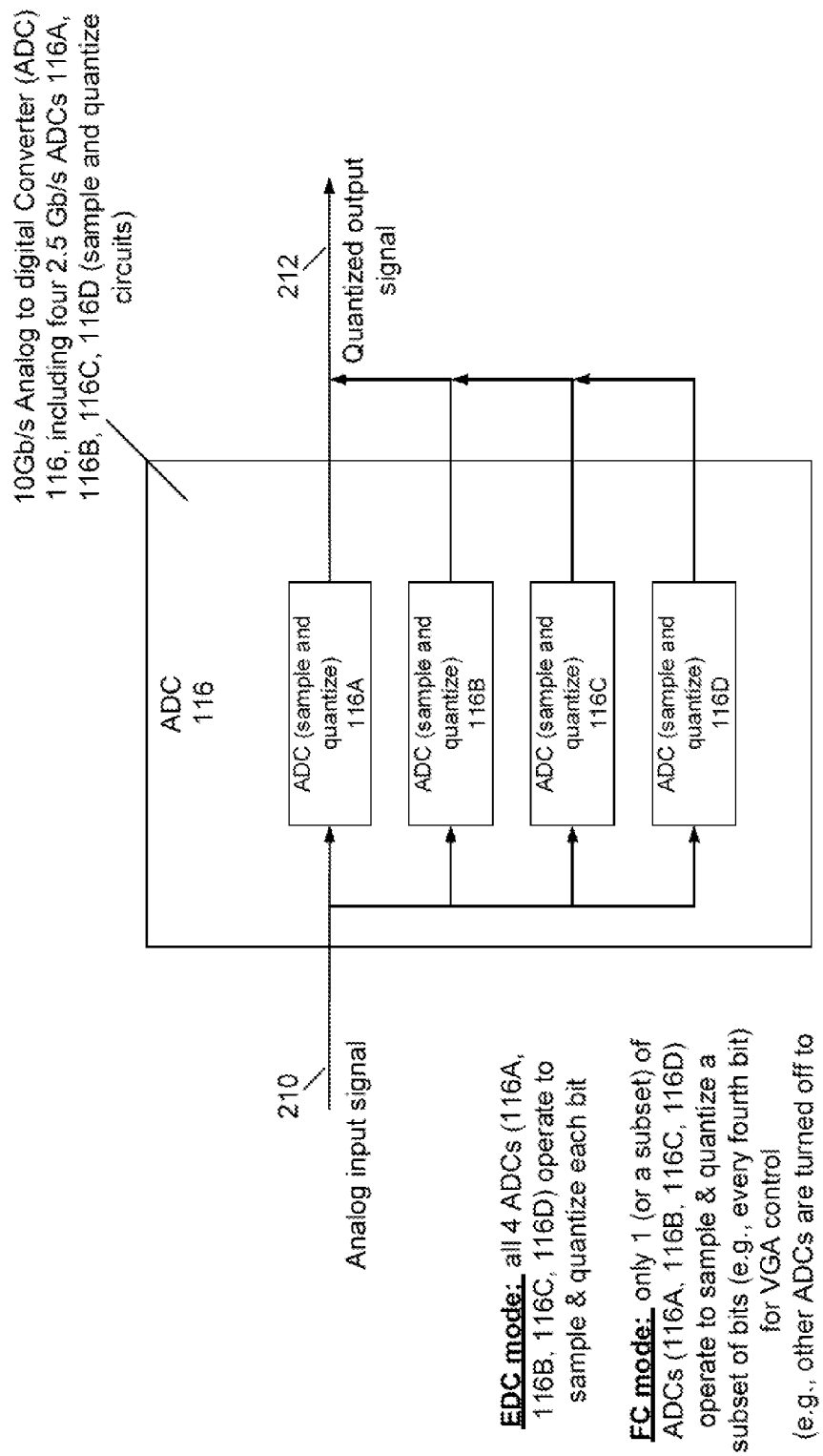
FIG. 2 is a block diagram illustrating ADCs according to an example embodiment.

FIG. 2 is a block diagram illustrating an analog-to-digital converter (ADC) 116 shown in FIG. 1 according to an example embodiment. ADC 116 may include a plurality of analog-to-digital converters 116A, 116B, 116C and 116D. Although four ADCs are shown, any number may be used. The ADCs 116A, 116B, 116C, 116D may be interleaved or connected in parallel, where each ADC may receive the analog signal via line 210. In one example embodiment, each individual ADC 116A, 116B, 116C and 116D may each include a sample and quantize circuit (sampler and quantizer circuits) to sample and quantize the received signal, and output the quantized signal via line 212.

However, in one example embodiment, due to the interleaved or parallel arrangement of the ADCs 116A-116D, each ADC 116A-116D in FIG. 2 may operate at a data rate that is less than the data rate of the received analog signal. For example, the data signal may operate at a multiple of operational speed (or data rate) of each individual ADC 116A-116D, where the multiple may be the number of ADCs 116A, 116B, 116C and 116D, for example. For example, since there are four ADCs in this example (ADCs 116A-116D), each ADC 116A, 116B, 116C and 116D may operate at ¼ (or one quarter) the speed of the received analog data signal, where each ADC 116 may sample and quantize only $1/4^{th}$ (or one quarter of the received bits). Thus, in an example embodiment, the received signal may provide a data rate of 10 Gbps, and each individual ADC (116A, 116B, 116C and 116D) may operate at a sampling rate of 2.5 Gsamples/s (Gsps). Thus, in this illustrative example embodiment, each of the four ADCs (116A- 116D) in FIG. 2 may sample and quantize every fourth bit, e.g., sample at a data rate of 2.5 Gsps, so that the group of ADCs 116A-116D may collectively sample and quantize at a data rate of 4*2.5 Gsps=10 Gsps, which matches (or alternatively, may be greater than or equal to) the data rate of the received signal (e.g., 10 Gbps). This is merely one example embodiment, and other data rates and numbers of ADCs may be used.

During IEEE/EDC mode, the plurality (e.g., all) of ADC circuits 116A, 116B, 116C and 116D may be operative so as to sample and quantize each (and every) bit of the received signal. This allows the circuits of the IEEE/EDC path to: 1) VGA control 114 to receive quantized amplitude values for each bit of the received analog signal and output a signal via line 115 to control VGA (e.g., to adjust the amplitude of the signal output by VGA 112); and 2) for equalizer (FFE/DFE) 118 to perform digital equalization based on each and every bit of the received signal being sampled and quantized by ADC 116. This allows EDC TR 122 to properly operate and adjust the data sampling point for ADC 116. Thus, while in IEEE/EDC mode, power may be applied to each (or to all) of the plurality of ADCs (e.g., 116A, 116B, 116C and 116D) so that each (or all) of these ADCs are operative to sample and quantize each (or all) of the received data bits.

During FC mode, the analog data signal output from VGA 112 is equalized by APF 124 and then input to slicer 126 where the signal is sampled. Thus, for FC mode, data sampling of the analog signal happens at slicer 126. In FC mode, ADC 116 is used only to provide sufficient data to VGA controller 114 via line 117A to allow VGA controller 114 to control or adjust the output amplitude for VGA 112 (note that blocks 118, 120 and 122 are non-operative during FC mode). Therefore, according to an example embodiment, to provide sufficient data to allow VGA controller 114 to operate properly, not all of the data bits of the received analog signal need to be sampled and quantized. Rather, only a subset of the data bits need to be sampled and quantized by ADC 116 to allow VGA controller 114 to sufficiently control VGA 112. Therefore, for example, every other bit (or only half the bits) of the received analog signal may be sampled and quantized by ADC 116, or every fourth bit may be sampled and quantized by ADC 116 (these are just examples), which may provide quantized data at a sufficient rate to VGA controller 114 to allow VGA controller to operate properly in adjusting the amplitude of VGA 112.

For example, VGA controller 114 may find peaks of the signal relative to a threshold (or thresholds), and then output a control signal to VGA 112 based on whether the signal is above or below such threshold. In an example embodiment, it may be sufficient for VGA controller 114 to receive quantized data for only a subset (or portion) of the bits of the received analog signal, e.g., receive a quantized signal for every fourth ($4^{th}$) bit. Thus, in this example, because only a portion (or subset) of the bits may be (or need to be) sampled and quantized by ADC 116, only a portion or subset of the ADCs 116A, 116B, 116C and 116D need to be operative.

Thus, for example, if half of the bits will be sampled and quantized by ADC 116 in FC mode, e.g., every other bit to be sampled and quantized, then only two of the four ADCs may be operative. For example, power may be applied to ADC 116A and 116C (so that these two ADCs are operative to sample and quantize half of the data bits or two out of four data bits), while power may not be applied to ADCs 116B and 116D (so that these two ADCs are non-operative), to conserve power in FC mode.

In another example embodiment, only one out of four (or ¼) data bits will be sampled and quantized by ADC 116. Therefore, in this example, only one of the ADCs needs to be operative, with the other three ADCs non-operative. Thus, for example, power may be applied only to ADC 116A so that ADC 116A may be operative to sample and quantize every fourth bit of the received analog data signal, and no power may be applied to ADCs 116B, 116C and 116D so that these three ADCs are non-operative, e.g., to conserve power in FC mode.

Therefore, according to an example embodiment, all four of the ADCs 116 may be operative for IEEE/EDC mode to allow all data bits to be sampled. While, only a subset of the ADCs 116 may be operative in FC mode to sample and quantize only a subset of the bits of the analog signal for VGA control.

In an example embodiment, in addition to supporting Fibre Channel (FC), the FC path 132 may also support one or more other protocols. For example, in one example embodiment, the FC Path 132 may support 10 GBASE-SR/LR (single mode and multi-mode fiber) in an alternative "low power" mode. The rationale for the FC path 132 supporting this low power mode of 10 GBASE-SR/LR is the same as that described for FC. That is, if the 10 GBASE-SR/LR channel is known to be benign, then the simpler, lower power mode of the FC path 132 may be used (e.g., where not all ADC circuits may be operative or powered on, but rather only a subset of the ADC circuits may be operative or powered/turned on to save power) to support 10 GBASE-SR/LR.

According to an example embodiment, a communications receiver (e.g., 110) may include a variable gain amplifier (VGA) (e.g., 112) configured to amplify received signals; a VGA controller configured to control the VGA; a plurality of analog to digital converter (ADC) circuits (e.g., 116A-116D) coupled to an output of the VGA; wherein the plurality of ADC circuits are operational when the communications receiver is configured to process signals of a first communications protocol (e.g., IEEE/EDC mode), and wherein only a subset (e.g., 116A and/or 116A and 116C) of the ADC circuits are operational when the communications receiver is configured to process signals of a second communications protocol (e.g., FC mode).

In an example embodiment, each ADC circuit may include a sample and quantize circuit. In an example embodiment, only one of the ADC circuits (e.g., 116A) may be operational and a remaining group (e.g., 116B, 116C and 116D) of the plurality of ADC circuits being turned off when the communications receiver is configured to process signals of a second communications protocol.

In an example embodiment, the first communications protocol may include at least one of IEEE (Institute of Electrical and Electronics Engineers) 10 GBASE-LRM (legacy multi-mode fiber), IEEE 10 GBASE-SR/LR (single mode and multi-mode fiber) or IEEE 10 GBASE-KR (copper backplane), and wherein the second communications protocol comprises Fibre Channel.

In an example embodiment, the communications receiver may further include:
a first sub-circuit coupled to an output of the plurality of ADC circuits, the first sub-circuit operational when the communications receiver is configured to process signals of the first communications protocol and being turned off when the communications receiver is configured to process signals of the second communications protocol; and a second sub-circuit coupled to an output of the VGA, the second sub-circuit being operational when the communications receiver is configured to process signals of the second communications protocol and being turned off when the communications receiver is configured to process signals of the first communications protocol.

In an example embodiment, the first sub-circuit may include: an equalizer circuit coupled to an output of the ADC circuits; a slicer coupled to an output of the equalizer circuit; and a timing recovery circuit coupled to the ADC circuits, wherein the timing recovery circuit is configured to perform timing recovery for signals associated with the first communications protocol.

In an example embodiment, the equalizer circuit may include a feed forward equalizer and a decision feedback equalizer (FFE/DFE).

In an example embodiment, the second sub-circuit may include: a slicer coupled to an output of the VGA; and a timing recovery circuit coupled to the ADC circuits, wherein the timing recovery circuit is configured to perform timing recovery for signals associated with the second communications protocol.

In another example embodiment, a communications receiver may include: an analog front end including a plurality of analog to digital converter (ADC) circuits; wherein the plurality of ADC circuits are operational when the communications receiver is configured to process signals of a first communications protocol, and wherein only a subset of the ADC circuits are operational when the communications receiver is configured to process signals of a second communications protocol.

In one embodiment, the analog front end may include at least a variable gain amplifier (VGA). In an example embodiment, only one of the ADC circuits are operational and a remaining group of the plurality of ADC circuits being turned off when the communications receiver is configured to process signals of a second communications protocol.

In an example embodiment, the first communications protocol may include at least one of IEEE (Institute of Electrical and Electronics Engineers) 10 GBASE-LRM (legacy multi-mode fiber), IEEE 10 GBASE-SR/LR (single mode and multi-mode fiber) or IEEE 10 GBASE-KR (copper backplane), and wherein the second communications protocol may include Fibre Channel.

The communications receiver may further include: a first sub-circuit coupled to an output of the plurality of ADCs, the first sub-circuit operational when the communications receiver is configured to process signals of the first communications protocol and being turned off when the communications receiver is configured to process signals of the second communications protocol; and a second sub-circuit coupled to the analog front end, the second sub-circuit being operational when the communications receiver is configured to process signals of the second communications protocol and being turned off when the communications receiver is configured to process signals of the first communications protocol.

In an example embodiment, the first sub-circuit may include: an equalizer circuit coupled to an output of the ADC circuits; a slicer coupled to an output of the equalizer circuit; and a timing recovery circuit coupled to the ADC circuits, wherein the timing recovery circuit is configured to perform timing recovery for signals associated with the first communications protocol. The second sub-circuit may include: a slicer coupled to an output of the VGA; and a timing recovery circuit coupled to the ADC circuits, wherein the timing recovery circuit is configured to perform timing recovery for signals associated with the second communications protocol.

Figure 3:
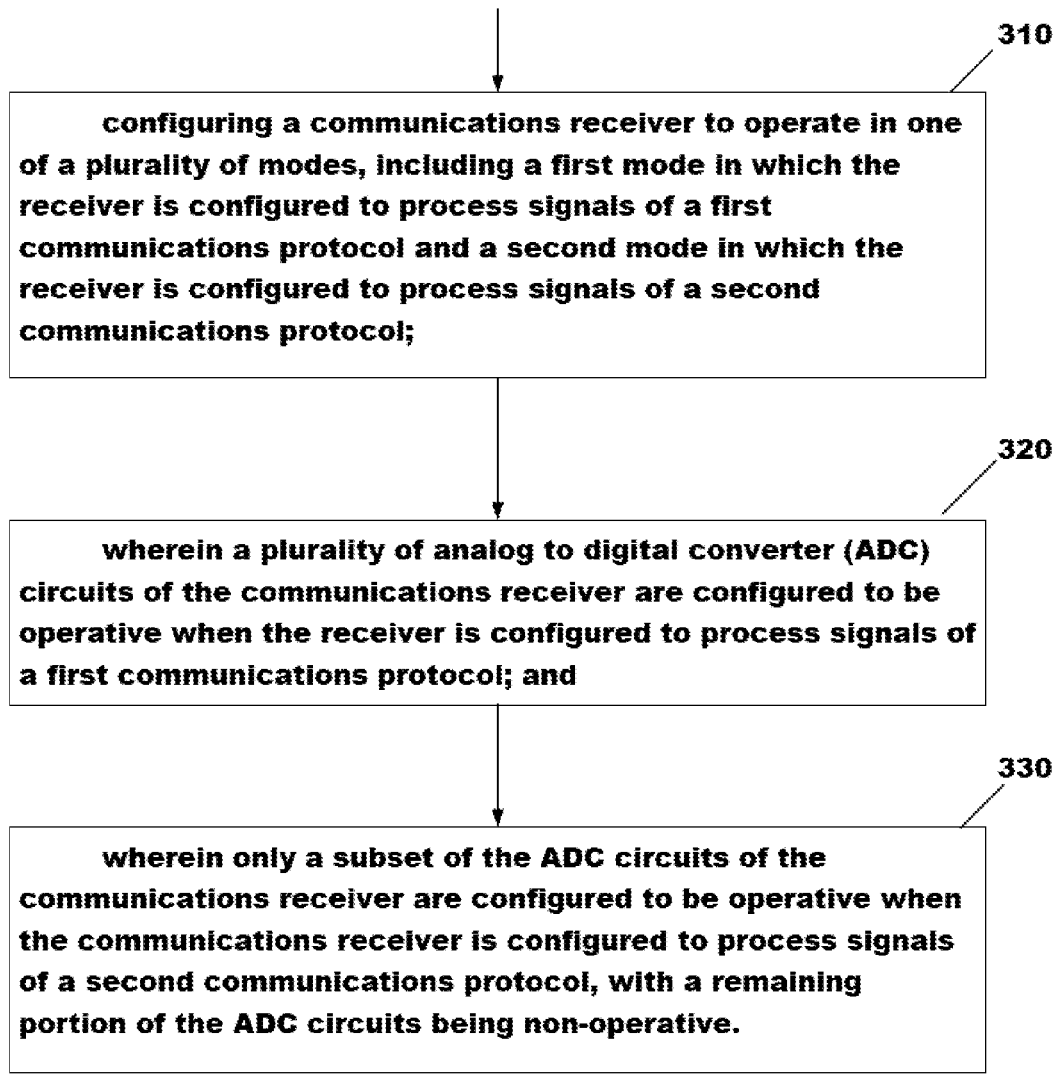
FIG. 3 is a flow chart illustrating operation of a receiver according to an example embodiment.

FIG. 3 is a flow chart illustrating operation of a communications receiver according to an example embodiment. Operation 310 may include configuring a communications receiver to operate in one of a plurality of modes, including a first mode in which the receiver is configured to process signals of a first communications protocol and a second mode in which the receiver is configured to process signals of a second communications protocol; At operation 320, a plurality of analog to digital converter (ADC) circuits of the communications receiver are configured to be operative when the receiver is configured to process signals of a first communications protocol; and at operation 330, only a subset of the ADC circuits of the communications receiver are configured to be operative when the communications receiver is configured to process signals of a second communications protocol, with a remaining portion of the ADC circuits being non-operative.

In an example embodiment, the first communications protocol may include, for example, at least one of IEEE (Institute of Electrical and Electronics Engineers) 10 GBASE-LRM (legacy multi-mode fiber), IEEE 10 GBASE-SR/LR (single mode and multi-mode fiber) or IEEE 10 GBASE-KR (copper backplane), and wherein the second communications protocol may include Fibre Channel.

In an example embodiment, the plurality of the ADC circuits may be configured to sample and quantize all bits when the receiver is configured in the first mode, and wherein the subset of the ADC circuits are configured to sample and quantize only a subset of the bits for gain control when the receiver is configured in the second mode.

In an example embodiment, only one of the plurality of ADC circuits of the communications receiver are configured to be operative when the communications receiver is configured to process signals of a second communications protocol, with a remaining portion of the plurality of ADC circuits being non-operative to conserve power Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, hardware circuits or blocks, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A communications receiver comprising:
a variable gain amplifier (VGA) configured to amplify received signals;
a VGA controller configured to control the VGA;
a plurality of analog to digital converter (ADC) circuits coupled to an output of the VGA;
wherein the plurality of ADC circuits are operational when the communications receiver is configured to process signals of a first communications protocol, wherein only a subset of the ADC circuits are operational when the communications receiver is configured to process signals of a second communications protocol, and wherein the VGA controller is configured to control the VGA by using digital amplitude signals received from the plurality of ADC circuits.

2. The apparatus of claim 1 wherein each ADC circuit comprises a sample and quantize circuit.

3. The apparatus of claim 1 wherein only one of the ADC circuits are operational and a remaining group of the plurality of ADC circuits are being turned off when the communications receiver is configured to process signals of a second communications protocol.

4. The apparatus of claim 1 wherein the first communications protocol comprises at least one of IEEE (Institute of Electrical and Electronics Engineers) 10GBASE-LRM (legacy multi-mode fiber), IEEE 10GBASE-SR/LR (single mode and multi-mode fiber) or IEEE 10GBASE-KR (copper backplane) or SFF 8431 Specifications for Enhanced Small Form Factor Pluggable Module SFP+, and wherein the second communications protocol comprises a Fiber Channel protocol or one of the first communications protocols is related to operating in a low power mode.

5. The apparatus of claim 1 wherein the communications receiver further comprises:
a first sub-circuit coupled to an output of the plurality of ADC circuits, the first sub-circuit being operational when the communications receiver is configured to process signals of the first communications protocol and being turned off when the communications receiver is configured to process signals of the second communications protocol; and a second sub-circuit coupled to an output of the VGA, the second sub-circuit being operational when the communications receiver is configured to process signals of the second communications protocol and being turned off when the communications receiver is configured to process signals of the first communications protocol.

6. The apparatus of claim 5 wherein the first sub-circuit comprises:
an equalizer circuit coupled to an output of the ADC circuits and a timing recovery circuit;
a slicer coupled to an output of the equalizer circuit and configured to provide digital signals to a processor; and
the timing recovery circuit coupled to the ADC circuits, wherein the timing recovery circuit is configured to receive an output of the equalizer circuit and to perform timing recovery for signals associated with the first communications protocol based on the output of the equalizer circuit.

7. The apparatus of claim 6 wherein the equalizer circuit comprises a feed forward equalizer and a decision feedback equalizer (FFE/DFE).

8. The apparatus of claim 5 wherein the second sub-circuit comprises:
a slicer coupled to an output of an analog equalizer and configured to provide digital signals to a processor; and
a timing recovery circuit coupled to the analog equalizer, wherein the timing recovery circuit is configured to perform timing recovery for signals associated with the second communications protocol.

9. A communications receiver comprising:
an analog front end including a plurality of analog to digital converter (ADC) circuits and a sub-circuit configured to provide digital signals to a processor; wherein the plurality of ADC circuits are operational when the communications receiver is configured to process signals of a first communications protocol, wherein only a subset of the ADC circuits are operational when the communications receiver is configured to process signals of a second communications protocol, and wherein the sub-circuit includes an analog equalizer providing signals to a timing recovery circuit that detects peaks and valleys of received signals.

10. The apparatus of claim 9 wherein the analog front end comprises at least a variable gain amplifier (VGA).

11. The apparatus of claim 9 wherein only one of the ADC circuits are operational and a remaining group of the plurality of ADC circuits are being turned off when the communications receiver is configured to process signals of a second communications protocol.

12. The apparatus of claim 9 wherein the first communications protocol comprises at least one of IEEE (Institute of Electrical and Electronics Engineers) 10GBASE-LRM (legacy multi-mode fiber), IEEE 10GBASE-SR/LR (single mode and multi-mode fiber), IEEE 10GBASE-KR (copper backplane) or SFF 8431 Specifications for Enhanced Small Form Factor Pluggable Module SFP+, and wherein the second communications protocol comprises a Fiber Channel protocol or 10GBASE-SR/LR (single mode and multi-mode fiber) in a low power mode.

13. The apparatus of claim 9 wherein the communications receiver further comprises:
a first sub-circuit coupled to an output of the plurality of ADCs, the first sub-circuit being operational when the communications receiver is configured to process signals of the first communications protocol and being turned off when the communications receiver is configured to process signals of the second communications protocol; and
a second sub-circuit coupled to the analog front end, the second sub-circuit being operational when the communications receiver is configured to process signals of the second communications protocol and being turned off when the communications receiver is configured to process signals of the first communications protocol.

14. The apparatus of claim 13 wherein the first sub-circuit comprises:
an equalizer circuit coupled to an output of the ADC circuits and a timing recovery circuit;
a slicer coupled to an output of the equalizer circuit and configured to provide digital signals to a processor; and
the timing recovery circuit coupled to the ADC circuits, wherein the timing recovery circuit is configured to receive an output of the equalizer circuit and to perform timing recovery for signals associated with the first communications protocol based on the output of the equalizer circuit.

15. The apparatus of claim 13 wherein the second sub-circuit comprises:
a slicer coupled to an output of an analog equalizer and configured to provide digital signals to a processor; and
a timing recovery circuit coupled to the analog equalizer, wherein the timing recovery circuit is configured to perform timing recovery for signals associated with the second communications protocol.

16. A method comprising:
configuring a communications receiver to operate in one of a plurality of modes, including a first mode in which the receiver is configured to process signals of a first communications protocol and a second mode in which the receiver is configured to process signals of a second communications protocol;
wherein a sub-circuit of the communications receiver is configured to provide digital signals to a processor and a plurality of analog to digital converter (ADC) circuits of the communications receiver are configured to be operative when the receiver is configured to process signals of a first communications protocol;
wherein only a subset of the ADC circuits of the communications receiver are configured to be operative when the communications receiver is configured to process signals of a second communications protocol, with a remaining portion of the ADC circuits being non-operative; and
wherein the sub-circuit includes an analog equalizer providing signals to a timing recovery signal that detects peaks and valleys of received signals.

17. The method of claim 16 wherein the first communications protocol comprises at least one of IEEE (Institute of Electrical and Electronics Engineers) 10GBASE-LRM (legacy multi-mode fiber), IEEE 10GBASE-SR/LR (single mode and multi-mode fiber) or IEEE 10GBASE-KR (copper backplane), and wherein the second communications protocol comprises a Fiber Channel protocol.

18. The method of claim 16 wherein the plurality of the ADC circuits are configured to sample and quantize all bits when the receiver is configured in the first mode, and wherein the subset of the ADC circuits are configured to sample and quantize only a subset of the bits for gain control when the receiver is configured in the second mode.

19. The method of claim 16 wherein only one of the plurality of ADC circuits of the communications receiver is configured to be operative when the communications receiver is configured to process signals of a second communications protocol, with a remaining portion of the plurality of ADC circuits being non-operative to conserve power.

* * * * *